(12) United States Patent
Hammons, Jr.

(10) Patent No.: US 7,471,742 B2
(45) Date of Patent: Dec. 30, 2008

(54) METHOD AND CONSTRUCTION FOR SPACE-TIME CODES FOR AM-PSK CONSTELLATIONS

(75) Inventor: Arthur R. Hammons, Jr., North Potomac, MD (US)

(73) Assignee: The Johns Hopkins University, Baltimore, MD (US)

( * ) Notice: Subject to any disclaimer, the term of this patent is extended or adjusted under 35 U.S.C. 154(b) by 772 days.

(21) Appl. No.: 11/094,661

(22) Filed: Mar. 30, 2005

(65) Prior Publication Data

US 2005/0220210 A1   Oct. 6, 2005

Related U.S. Application Data

(60) Provisional application No. 60/557,589, filed on Mar. 30, 2004.

(51) Int. Cl.
*H04L 27/00*   (2006.01)

(52) U.S. Cl. .................. 375/299; 375/295; 375/259; 375/240; 375/242; 375/219; 375/316; 375/265; 375/341; 455/73; 704/242; 714/795

(58) Field of Classification Search ................ 375/299, 375/259, 240, 242, 295, 219, 316, 265, 341; 455/73; 704/242; 714/795
See application file for complete search history.

(56) References Cited

U.S. PATENT DOCUMENTS

2002/0122502 A1 * 9/2002 El-Gamal et al. ........... 375/267
2004/0151256 A1 * 8/2004 Hwang et al. ............... 375/267

FOREIGN PATENT DOCUMENTS

EP   1267508 A1 * 12/2002

OTHER PUBLICATIONS

Youjian (Eugene) Liu et al., "A Rank Criterion for QAM Space-Time Codes," IEEE Transactions on Information Theory, Dec. 2002, pp. 3062-3079, vol. 48, No. 12, IEEE,New York NY.
Hsiao-Feng Lu et al., "Rate Diversity Tradeoff of Space-Time Codes With Fixed Alphabet and Optimal Constructions for PSK Modulation," IEEE Transactions on information Theory, Oct. 2003, pp. 2747-2751, vol. 49, No. 10, IEEE, New York NY.
Vahid Tarokh et al., "Space-Time Codes for High Data Rate Wireless Communication: Performance Criterion and Code Construction," IEEE Transactions on Information Theory, Mar. 1998, pp. 744-759, vol. 44, No. 2, IEEE, New York NY.
A. Roger Hammons, Jr. et al., "On the Theory of Space-Time Codes for PSK Modulation," IEEE Transactions on Information Theory, Mar. 2000, pp. 524-542, vol. 46, No. 2, IEEE New York NY.

(Continued)

*Primary Examiner*—David C Payne
*Assistant Examiner*—Zewdu Kassa
(74) *Attorney, Agent, or Firm*—Albert J. Fasulo, II (57) ABSTRACT

Space-time codes are developed for multi-radii AM-PSK constellations. Further, a "super-unified" space-time code construction is developed that incorporates multi-radii AM-PSK codes with the Lu-Kumar unified codes. The multi-radii space-time codes achieve the rate-diversity tradeoff—that is, the codes transmits information at the maximum rate possible for the given signaling constellation and the achieved transmit diversity level.

12 Claims, 5 Drawing Sheets

OTHER PUBLICATIONS

Hsiao-Feng Lu et al., "Generalized Unified Construction of Space-Time Codes with Optimal Rate-Diversity Tradeoff," ISIT 2004, Jun. 27-Jul. 2, 2004, p. 99, IEEE New York NY.

Hsiao-Feng Lu et al., "Rate-Diversity Tradeoff of Space-Time Codes with Fixed Alphabet and Optimal Constructions," ISIT 2003, Jun. 29-Jul. 4, 2003, p. 242, IEEE New York NY.

* cited by examiner

Table I. Representative AM-PSK Constellations for New Space-Time Codes

| | Normalized = |
|---|---|---|
| $K=2, L=1$ $\nu = -(1-\theta)$ | 8 | 0.8165 |
| $K=3, L=1$ $\nu = (3\theta + 2\theta^4 + 2\theta^6 + \theta^7)(1-\theta)$ | 16 | 0.5608 |
| $K=4, L=1$ $\nu = (\theta^2 + \theta^5 + \theta^7 + \theta^8 + \theta^{12} + \theta^{14})(1-\theta)$ | 32(c) | 0.3320 |
| *Dual-Radii Special A* | | |
| $K=2, L=1$ $\nu = -2$ | 4 | 0.8944 |
| $K=3, L=1$ $\nu = (2 + 2\theta^3 + \theta^5 + \theta^6)(1-\theta)$ | 8(a) | 0.9153 |
| $K=4, L=1$ $\nu = (1 + \theta + \theta^{10} + \theta^{11} + \theta^{15})(1-\theta)$ | 16(b) | 0.5728 |
| *Multi-Radii* | | |
| $K=2, L=2$ $\nu = -(1-\theta)$ | 16 | 0.2722 |
| $K=3, L=2$ $\nu = (2\theta + 2\theta^4 + \theta^6)(1-\theta)$ | 32 | 0.3132 |
| $K=4, L=2$ $\nu = (\theta + \theta^3 + \theta^{12})(1-\theta)$ | 64(d) | 0.2285 |
| *Multi-Radii Special A* | | |
| $K=3, L=2$ $\nu = (2 + 2\theta^3 + \theta^5 + \theta^6)(1-\theta)$ | 8 | 0.8528 |
| $K=4, L=2$ $\nu = (\theta + \theta^4 + \theta^8 + \theta^{11} + \theta^{13})(1-\theta)$ | 16 | 0.5376 |

(a) See Fig. 4a for constellation
(b) See Fig. 4b for constellation
(c) See Fig. 4c for constellation
(d) See Fig. 4d for constellation

Figure 5

METHOD AND CONSTRUCTION FOR SPACE-TIME CODES FOR AM-PSK CONSTELLATIONS

CROSS-REFERENCE TO RELATED APPLICATIONS

This application is based on and claims the benefit of prior filed Provisional U.S. Application No. 60/557,589, filed on Mar. 30, 2004, the entire contents of which are incorporated herein by reference.

STATEMENT OF GOVERNMENTAL INTEREST

This invention was made with Government support under Grant No. CCR-0325781 awarded by the National Science Foundation. The Government has certain rights in the invention.

BACKGROUND OF THE INVENTION

1. Field of the Invention

The invention relates generally to PSK-modulated space-time codes, and more particularly, to the method and construction of space-time codes for AM-PSK constellations.

2. Description of the Related Art

Recent advances in coding theory include space-time codes which provide diversity in multiple-input multiple-output (MIMO) antenna systems over fading channels with channel coding across a small number of transmit antennas. For wireless communication systems, a number of challenges arise from the harsh RF propagation environment characterized by channel fading and co-channel interference (CCI). Channel fading can be attributed to diffuse and specular multipath, while CCI arises from reuse of radio resources. Interleaved coded modulation on the transmit side of the system and multiple antennas on the receive side are standard methods used in wireless communication systems to combat time-varying fading and to mitigate interference. Both are examples of diversity techniques.

Simple transmit diversity schemes (in which, for example, a delayed replica of the transmitted signal is retransmitted through a second, spatially-independent antenna and the two signals are coherently combined at the receiver by a channel equalizer) have also been considered within the wireless communications industry as a method to combat multipath fading. From a coding perspective, such transmit diversity schemes amount to repetition codes and encourage consideration of more sophisticated code designs. Information-theoretic studies have demonstrated that the capacity of multi-antenna systems significantly exceeds that of conventional single-antenna systems for fading channels. The challenge of designing channel codes for high capacity multi-antenna systems has led to the development of "space-time codes," in which coding is performed across the spatial dimension (e.g, antenna channels) as well as time.

Space-time codes are designed for MIMO communication systems that employ multiple transmit antennas to achieve spatial diversity. The modulated code words are often presented as complex-values M×T matrices in which the (m,t)-th entry $s_{m,t}$ represents the discrete baseband signal transmitted from the m-th transmit antenna at time t. The initial work on space-time codes by Guey et al. and Tarokh et al. showed that the transmit diversity achieved by a space-time code is equal to the minimum rank among the set of matrices produced as differences between distinct modulated code words. There is a tradeoff between achievable transmission rate and achievable transmit diversity level for space-time codes. Full-rank space-time codes can achieve transmission rates no greater than one symbol per transmission interval. For rank d space-time codes, the maximum transmission rate is M−d+1 symbols per transmission interval. Equivalently, the size of an M×T rank-d space-time code cannot exceed $q^{T(M-d+1)}$, where q is the size of the signaling constellation. Codes meeting this upper limit are referred to as maximal.

In U.S. Pat. No. 6,678,263, Hammons and El Gamal developed the so-called binary rank criteria that allowed, for the first time, the algebraic design of space-time codes achieving maximal spatial diversity of all orders. The binary rank criteria for BPSK- and QPSK-modulated space-time codes are based on the observation that the difference between two modulated code words will be of full rank, as a matrix over the complex field C, whenever a certain binary projection of the difference matrix is of full rank over the binary field GF(2). From the binary rank criteria, Hammons and El Gamal developed the general Stacking Construction for full-diversity space-time codes, examples of which include block codes derived from Galois fields/rings and rate 1/M convolutional codes of optimal $d_{free}$. The binary rank criteria showed that the algebraically-designed, full-rank, BPSK-modulated space-time codes could be lifted to full-rank, QPSK-modulated space-time codes. In particular, Hammons and El Gamal showed that, if the linear binary codes A and B produce full-rank space-time codes when BPSK modulated, then the quaternary code C=A+2B produces a full-rank space-time code under QPSK modulation. They referred to this construction as the Dyadic Construction.

Building on the Hammons-El Gamal framework, Liu et al. showed how the same techniques could be extended to $4^m$-QAM constellations. Thereafter, Lu and Kumar developed a generalization of that framework applicable to both the $4^m$-QAM and the general $2^m$-PSK cases. They showed that the Dyadic Construction extends to $2^m$-PSK modulation in the natural way—i.e., if the linear binary codes $A_0, A_1, \ldots, A_{m-1}$ produce full-rank space-time codes under BPSK modulation, then the $2^m$-ary code $$C = \sum_{i=0}^{m-1} 2^i A_i$$

produces a full-rank space-time code under $2^m$-PSK modulation. They showed that similar results apply to codes of rank d (less than full rank). Finally, Lu and Kumar provided a unified space-time code construction extending the Dyadic Construction for $2^m$-PSK modulation to include natural codes for $4^m$-QAM modulation. They proved that their unified space-time code construction is optimal for these modulations in the sense that it achieves the aforementioned rate-diversity tradeoff.

Dual radii AM-PSK constellations offer potential significant advantages over conventional PSK constellations. For example, Belzer et al. show that the 8-ary AM-PSK constellation consisting of two PQSK rings in a star configuration provides significantly higher capacity on partially coherent AWGN, Rayleigh, and Rician fading channels. However, nothing in the prior art teaches the development of general space-time code constructions for AM-PSK constellations or the unification of such constructions with the Lu-Kumar space-time codes for PSK and QAM constellations. Accordingly, it would be desirable to be able to utilize space-time code constructions for AM-PSK constellations, especially such codes that are optimal with respect to the rate-diversity tradeoff.

SUMMARY OF THE INVENTION

In accordance with the present invention, space-time codes are developed for multi-radii AM-PSK constellations. Further, a "super-unified" space-time code construction is developed that incorporates multi-radii AM-PSK codes with the Lu-Kumar unified codes. The multi-radii space-time codes achieve the rate-diversity tradeoff—that is, the codes transmits information at the maximum rate possible for the given signaling constellation and the achieved transmit diversity level.

BRIEF DESCRIPTION OF THE DRAWINGS

The various aspects, advantages and novel features of the present invention will be more readily comprehended from the following detailed description when read in conjunction with the appended drawings in which.

Throughout the drawing figures, like reference numerals will be understood to refer to like parts and components.

DETAILED DESCRIPTION OF THE PREFERRED EMBODIMENTS

Figure 1:
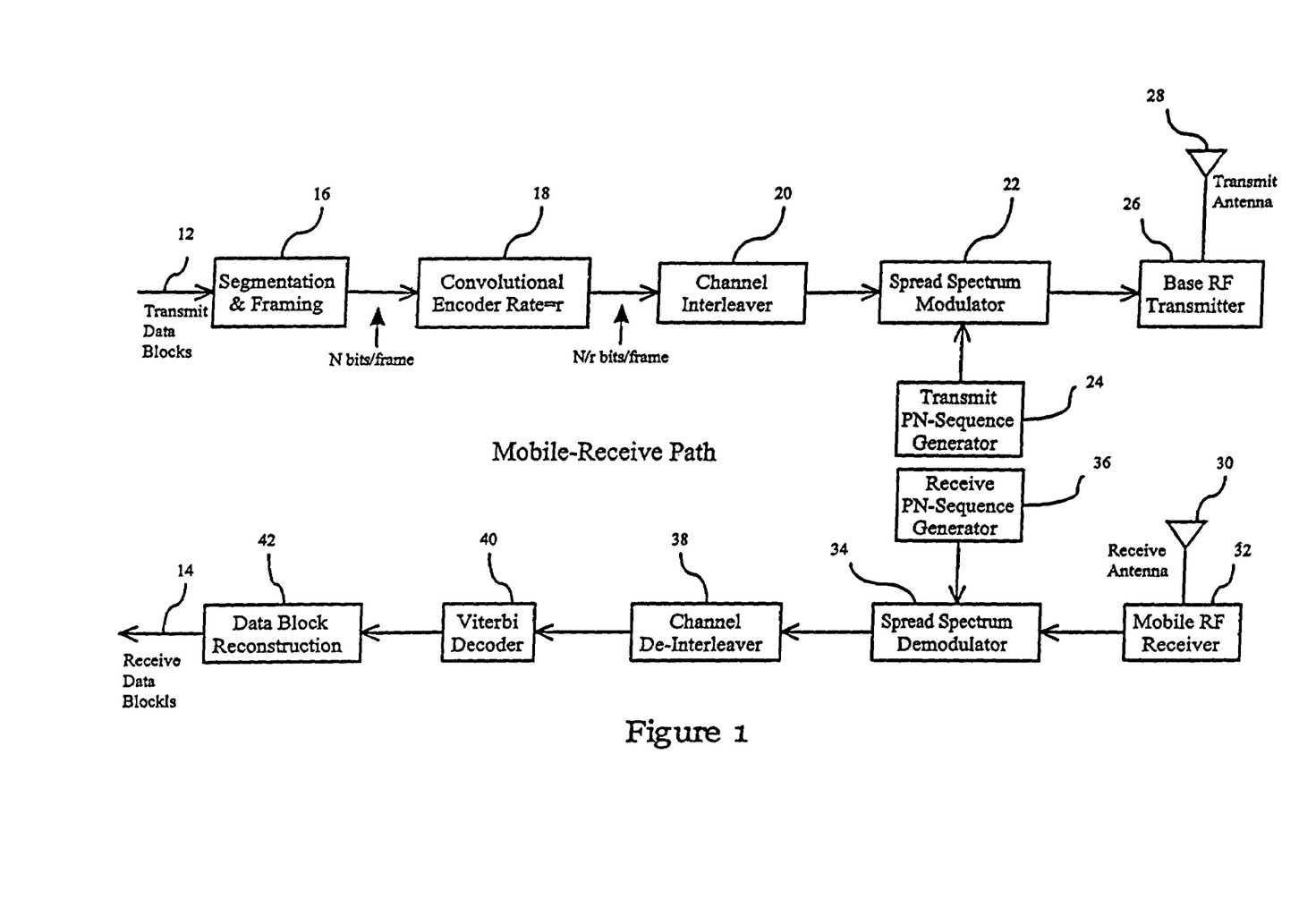
FIG. 1 is a block diagram of an exemplary digital cellular Direct Sequence Code Division Multiple Access (DS-CDMA) base-station-to-mobile-station (or forward) link.

Referring to FIG. 1, by way of an example, a conventional digital cellular Direct Sequence Code Division Multiple Access (DSCDMA) base-station-to-mobile-station (or forward) link 10 is shown using a conventional convolutional encoder and Viterbi decoder. FIG. 1 also illustrates the mobile-station-to-base-station (or reverse) link.

At the transmit end, the system 10 in FIG. 1 comprises a data segmentation and framing module 16 where user information bits are assembled into fixed length frames from transmit data blocks 12. The N bits per frame are input to the base station's convolutional encoder 18 of rate r, which produces N/r code symbols at the input of the channel interleaver 20. The channel interleaver 20 performs pseudo-random shuffling of code symbols, and outputs the re-arranged symbols to the spread spectrum modulator 22. The spread spectrum modulator 22 uses a user-specific transmit PN-code generator 24 to produce a spread spectrum signal which is carried on a RF carrier to the transmitter 26, where a high power amplifier coupled to the transmit antenna 28 radiates the signal to the base station. The techniques of spread spectrum modulation and RF transmission are well known art to one familiar with spread spectrum communications systems.

The signal received at the mobile station antenna 30 is amplified in the RF receiver 32 and demodulated by the spread spectrum demodulator 34, which uses the same PN-code generator 36 as used by the base station transmitter to de-spread the signal. The demodulated symbols are de-interleaved by the channel de-interleaver 38 and input to the Viterbi decoder 40. The decoded information bits are reconstructed using data block reconstruction 42 into receive data blocks 14 and forwarded to the data terminal equipment at the receive end.

Figure 2:
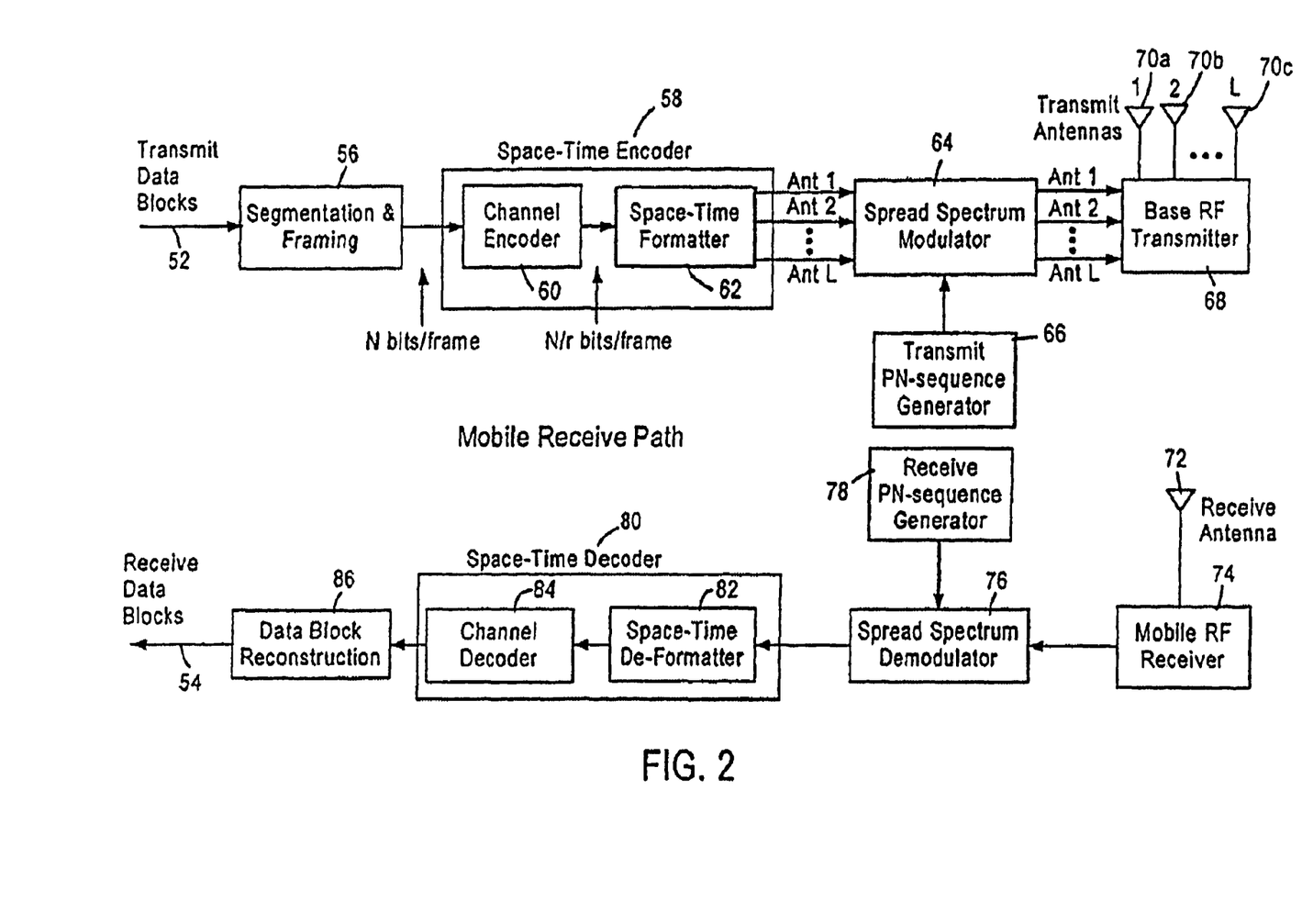
FIG. 2 is a block diagram of a system for a digital cellular system which implements space-time encoding and decoding in accordance with an embodiment of the present invention.

With reference to FIG. 2, a digital cellular base-station-to-mobile-station link is shown to illustrate the implementation of space-time encoding and decoding in accordance with an embodiment of the present invention. While CDMA system is used as an example, one familiar with the art would consider the present invention applicable to other types of wireless systems, which can employ other types of multiple access methods such as frequency division multiple access (FDMA), time division multiple access (TDMA), and hybrid methods.

Transmit data blocks 52 from the data terminal equipment are segmented and framed 56 into fixed frame length and applied to the mobile's channel space-time encoder 58. The output from a channel encoder 60 is fed to the space-time formatter 62 which determines the parsing (allocation and presentation order) of the coded symbols to the various transmit antennas 70a, 70b, 70c. The spatial formatter output is applied to the spread spectrum modulator 64 which uses a user specific PN-code generator 66 to create spread spectrum signals, carried on a RF carrier via base RF transmitter 68, to the mobile station transmitter. The transmitter, with high power amplifier coupled to the Transmit antenna, radiates the signals via separate transmit antennas to the mobile station.

The signal received at one or more mobile station antenna(s) 72 is amplified in the mobile RF receiver 74 and demodulated in a phase shift keying demodulator 76, which uses the same PN-code generator 78 as used by the base station transmitter, to de-spread the signal. The demodulated symbols are processed at space-time decoder 80 by the space-time de-formatter 82 and input to the channel decoder 84. The decoded information bits are reconstructed 86 into receive data blocks 54 and forwarded to the data terminal equipment at the receive end. Depending on the space-time code used, the de-formatter 82 and the decoder 84 can be grouped in a single maximum likelihood receiver.

Figure 3:
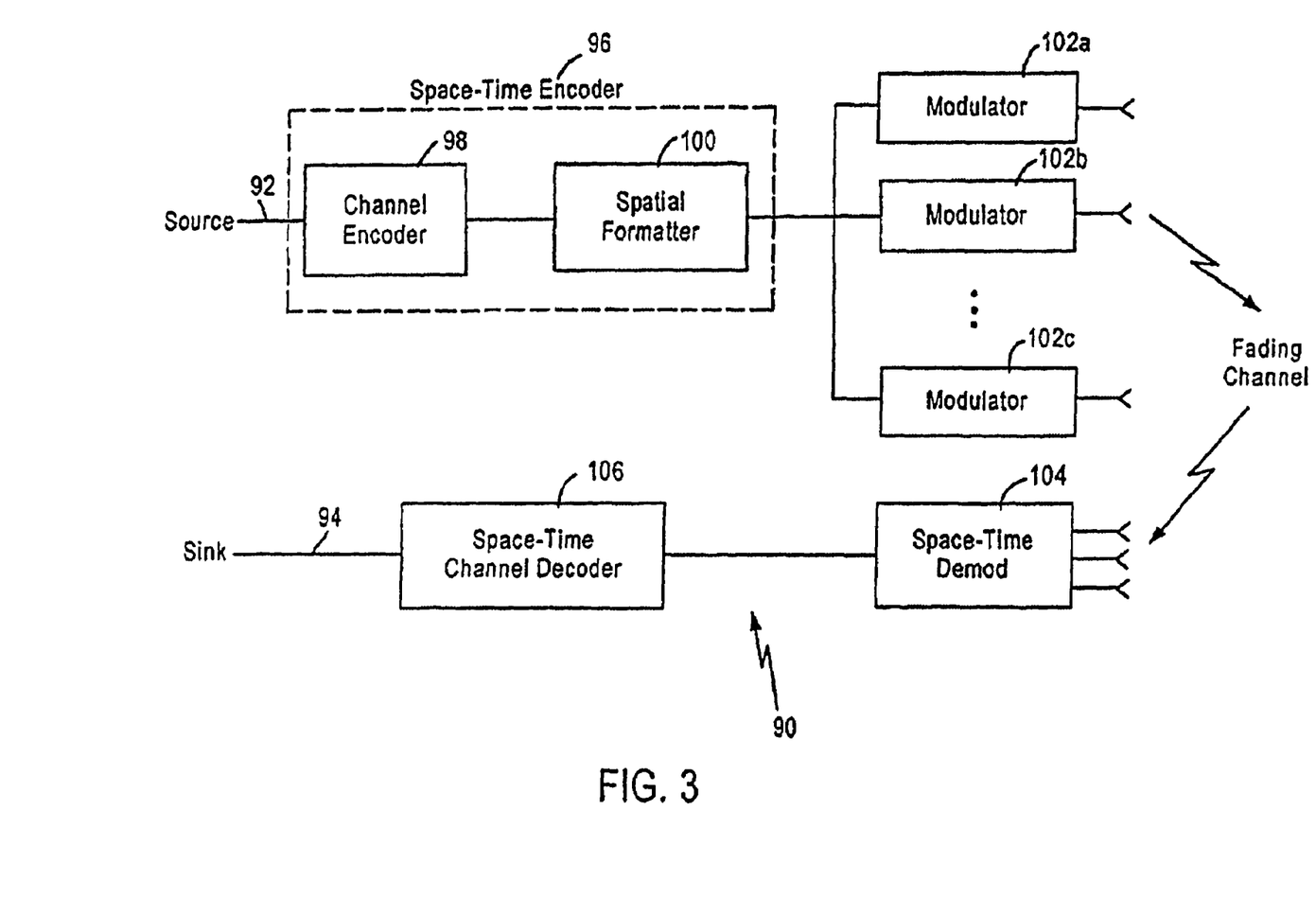
FIG. 3 is a block diagram illustrating space-time encoding and decoding in accordance with an embodiment of the present invention.
Figure 4:
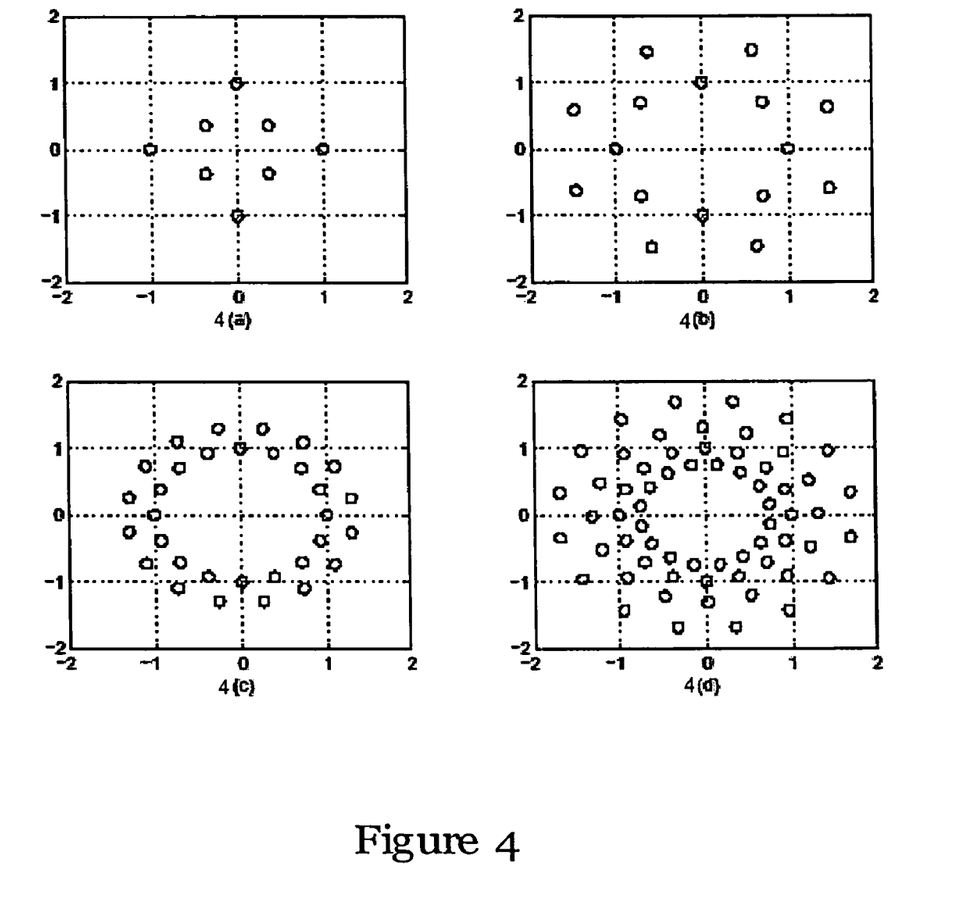
FIGS. 4a-4d are examples of representative constellations supporting multi-radii AM-PSK space-time codes in accordance with the present invention.

FIG. 3 illustrates an exemplary communication system 90 having a path 92 from a source and a path 94 to a sink and which can be a system other than a cellular system. The system 90 has a space-time encoder 96 that is similar to the encoder 58 depicted in FIG. 2 in that it comprises a constituent encoder 98 and a spatial formatter 100. Plural modulators 102a, 102b, 102c, and so on, are also provided. At the receiver end, a space-time demodulator 104 and a space-time decoder 106 are provided.

With continued reference to FIG. 3, the source generates k information symbols from a discrete alphabet X on the path 92 which are encoded by an error control code C by the space-time encoder 96. The space-time encoder 96 produces code words of length N over the symbol alphabet Y. The encoded symbols are mapped by the modulators 102a, 102b, 102c, and so on, onto constellation points from a discrete, complex-valued signaling constellation for transmission across the channel. The modulated radio frequency signals for all of the L transmit antennas 102a, 102b, 102c, and so on, are transmitted at the same time to the receiver space-time demodulator 104. The space-time channel decoder 106 decodes the signals to the received data path 94. As shown, the receiver provides M receive antennas to collect the incoming transmissions. The received baseband signals are subsequently decoded by the space-time decoder 106.

The present invention is concerned primarily with the design of space-time codes rather than the signal processing required to decode them. In most cases, the decoding employs known signal processing for maximum likelihood detection.

In the following discussion, notation is established and certain key ideas of the Lu-Kumar approach, upon which the novel space-time code constructions of the present invention are built, are explained. Following the discussion of the Lu-Kumar approach, new constructions of space-time codes for dual-radii and multi-radii AM-PSK constellations, in accordance with the present invention, are described. In addition, the novel AM-PSK constructions of the present invention are extended to produce a generalized AM-PSK code construction framework that includes the unified Lu-Kumar construction.

Let C be a code of length MT, with M=T, over the discrete alphabet $\Omega$. The codewords of C are presented as M×T matrices in which the (m,t)-th entry $a_{m,t} \in \Omega$ represents the information symbol that is modulated and transmitted from the m-th transmit antenna at transmission interval t. If all of the modulated code word matrices have rank at least d over C, then the space-time code is called an M×T rank-d code. In the special case that all of the modulated code words are of full rank M, the space-time code is called an M×T full-rank code.

There is a tradeoff between achievable transmission rate and achievable transmit diversity level for space-time codes. Full-rank space-time codes can achieve transmission rates no greater than one symbol per transmission interval. For rank d space-time codes, the maximum transmission rate is M−d+1 symbols per transmission interval. Equivalently, the size of an M×T rank-d space-time code cannot exceed $q^{T(M-d+1)}$, where q is the size of the signaling constellation $\Omega$. Codes meeting this upper limit are referred to as maximal.

The work of Lu and Kumar established a general mathematical framework for the method of algebraic space-time code design initiated by Hammons and El Gamal in which the rank of modulated code words over the field C is inferred from the rank of their projections as matrices over the binary field F. The Lu-Kumar framework makes use of the ring $Z[\theta]$ of algebraic integers associated with a primitive complex root of unity $\theta$.

The $2^K$-PSK constellation consists of the points $s=\theta^a$, $a \in Z_{2^K} = \{0,1,2,\ldots,2^K-1\}$, where $\theta$ is a complex, primitive $2^K$-th root of unity. The connection between modulated space-time codes, with entries from $Z[\theta] \subset C$, and binary codes over the field $F=\{0,1\}$ is through the isomorphism $Z[\theta]/(1-\theta) \cong F$. The function $\mu : Z[\theta] \to F$ denotes the corresponding projection modulo $1-\theta$. The set of M×T matrices over an alphabet $\Omega$ is denoted by $\Omega^{M \times T}$. When $A=[a_{i,j}]$ is a matrix with integer entries, $\theta^A$ is written for the matrix whose (i,j)-th entry is $\theta^{a_{i,j}}$. For matrices A and B, the matrix $A \odot B$ is their Hermitian (i.e., componentwise) product.

The following propositions present the core technical facts underlying the Lu-Kumar approach to space-time code design over $Z[\theta]$. The first two results highlight key elementary properties of the ring $Z[\theta]$. The following two results are the Lu-Kumar generalization of the Hammons-El Gamal binary rank criteria.

Proposition 1—Let $\theta$ be a complex, primitive $2^K$-th root of unity. Let $\Delta s = \theta^{2^t m} - \theta^{2^t n}$, where m and n are integers. Then, $(1-\theta^{2^t}) | \Delta s$ in $|Z[\theta]$. Furthermore, $$\frac{\Delta s}{1-\theta^{2^l}} \equiv \overline{m} \oplus \overline{n} \pmod{1-\theta},$$

where $\overline{m}$ and $\overline{n}$ denote the modulo 2 projections of m and n, respectively, and $\oplus$ denotes modulo 2 addition.

Proof: Without loss of generality, we may assume $m \leq n$. Then $$\frac{\theta^{2^l m} - \theta^{2^l n}}{1-\theta^{2^l}} = \theta^{2^l m} + \theta^{2^l(m+1)} + \ldots + \theta^{2^l(n-1)} \in Z[\theta].$$

On the right hand side of this equation, there are n−m terms, each projecting to 1 modulo $1-\theta$. Hence, $$\Delta s \equiv \overline{n-m} \equiv \overline{m} \oplus \overline{n} \pmod{1-\theta}.$$

Proposition 2—The integer 2 factors in $Z[\theta]$ as $$2 = (1-\theta^{2^m}) \prod_{k=m}^{K-2} (1+\theta^{2^k}),$$

for integer m, $0 \leq m \leq K-1$. Thus, $$(1-\theta^{2^m}) | 2,$$

for all $m=0, 1, \ldots, K-1$.

Proposition 3—Let C be complex M×T matrix, ($M \leq T$), with entries from $Z[\theta]$. If the binary projection $\mu(C)$ is of full rank over F, then C is of full rank over the field of complex numbers C.

Proof: Suppose C is singular over C. Then all M×M submatrices of C have zero determinants. Since the determinant calculations may be regarded as taking place in the subfield $Q[\theta] \subset C$, where Q is the set of rational numbers, then C is also singular as a matrix over $Q[\theta]$. Therefore, there exists a nonzero vector $y \in (Q[\theta])^M$ for which $yC=0$ in $Q[\theta]$. From y, one may derive a vector $x \in (Z[\theta])^M$ such that: (i) $xC=0$ in $Z[\theta]$; and (ii) not all components of x are divisible by $1-\theta$. Then, $\mu(x) \mu(C) = 0$ in F establishes that $\mu(C)$ is singular.

Corollary 4—Let C be complex M×T matrix, ($M \leq T$), with entries from $Z[\theta]$. If the binary projection $\mu(C)$ is of rank d over F, then C is of rank at least d over C.

Proof: If C has rank less than d, then every d×T submatrix of C is singular. By the previous argument, every d×T submatrix of $\mu(C)$ is also singular over F.

The following are novel codes for multi-radii PSK constellations in accordance with the present invention.

A. Dual-Radii $2^K$-PSK Construction

The novel space-time code construction of the present invention is a generalization of the basic dyadic construction for $2^K$-PSK. A first version of this construction gives optimal M×T space-time codes of full-rank.

Theorem 5 (Dual-Radii Construction-I) Let A be a maximal M×T full-rank binary code with $M \leq T$. Let $$C = \sum_{i=0}^{K-1} 2^i C_i,$$

where the binary codes $C_i$ are also maximal M×T full-rank codes. Let θ be a complex, primitive $2^K$-th root of unity. Choose nonzero v∈Z[θ] such that v≡0 (mod 1−θ), and set r=2v+1. Then the modulated space-time code defined by $$S=\{S=r^A \odot \theta^C : A \in \mathcal{A} \text{ and } C \in \mathcal{C}\}$$

achieves transmit diversity M and transmission rate R=K+1 bits per channel use.

Proof: Since the component binary codes are maximal, the number of code words in S is given by $$|S| = |\mathcal{A}||\mathcal{C}| = |\mathcal{A}|\prod_{i=0}^{K-1}|C_i| = 2^T \cdot 2^{KT}.$$

Hence, the transmission rate achieved by S is $$R = \frac{1}{T}\log_2|S| = K+1 \text{ (bits per channel use)}.$$

In order to establish the claim that S achieves diversity M, it suffices to show that the difference between any pair of distinct modulated code words is of full rank over C. Let $S=r^A \odot \theta^C$ and $S'=r^{A'} \odot \theta^{C'}$ be distinct code words in S, and let ΔS=S−S'. Then $$\Delta S = (\theta^C - \theta^{C'}) + (r-1)(A \odot \theta^C - A' \odot \theta^{C'}) \quad (1)$$

$$= (\theta^C - \theta^{C'}) + 2vD, \quad (2)$$

where $$D = A \odot \theta^C - A' \odot \theta^{C'}.$$

There are two cases to consider.

Case 1. C=C'. In this case, $\Delta S = 2v\theta^C \odot (A-A')$. Hence, $$\frac{\Delta S}{2v} \equiv A \oplus A' \pmod{1-\theta}. \quad (3)$$

By choice of the code A, the matrix A⊕A' is of full rank over F. Hence, by proposition 3, ΔS is of full rank over C.

Case 2. C≠C'. Let l denote the first index i for which $C_i \neq C'_i$. Then $C=P+2^l Q$ and $C'=P+2^l Q'$, where $$P = \sum_{i=0}^{l-1} 2^i C_i, \quad Q = \sum_{i=0}^{K-l-1} 2^i C_{l+i}, \text{ and } Q' = \sum_{i=0}^{K-l-1} 2^i C'_{l+i}.$$

Hence, $$\Delta S = \theta^P \odot (\theta^{2^l Q} - \theta^{2^l Q'}) + 2vD, \quad (4)$$

so that $$\frac{\Delta S}{1-\theta^{2^l}} = \theta^P \odot \left(\frac{\theta^{2^l Q} - \theta^{2^l Q'}}{1-\theta^{2^l}}\right) + \left(\frac{2}{1-\theta^{2^l}}\right)vD. \quad (5)$$

By Propositions 1 and 2, the terms in parentheses are scalars in Z[θ] or matrices with entries in Z[θ]. Since v≡0 (mod 1−θ), we have from Proposition 1

$$\frac{\Delta S}{1-\theta^{2^l}} \equiv C_l \oplus C'_l \pmod{1-\theta}. \quad (6)$$

By the choice of $\sigma$, the matrix $C_l \oplus C'_l$ is of full rank over F. Hence, by Proposition 3, ΔS is of full rank over C, which completes the proof.

Implicit in statement and proof of Theorem 5 is the fact the construction is not degenerate: Code words of S depend uniquely on choice of component code words, and the two PSK rings do not intersect non-trivially. The underlying signaling constellation associated with the dual-radii construction is the set of complex numbers $$\Omega = \{s = r^a \theta^c | a \in F, c \in Z_{2^K}\}.$$

The parameterization of Ω by (a,c) is considered non-degenerate if the mapping (a,c) ↦ s is 1−1. Less precisely, it can be said that the constellation supporting the space-time code S is non-degenerate if its (implied) parameterization is non-degenerate.

In Theorem 5, the choice of radius r guarantees the non-degeneracy of the underlying dual-radii $2^K$-PSK constellation. With its two rings of $2^K$-PSK, this constellation is capable of conveying at most K+1 bits per channel use. The new construction, therefore, achieves the rate-diversity tradeoff—i.e., the dual-radii $2^K$-PSK codes transmit information at the highest rate consistent with the achieved diversity level.

The full-rank construction is readily modified to provide space-time codes of rank d that also achieve the rate-diversity tradeoff.

Theorem 6 (Dual-Radii Construction—II) In the Dual-Radii Construction, let binary code A and the binary codes $C_i$ be maximal M×T rank-d codes with d≦M≦T. Then the modulated space-time code S achieves transmit diversity d and transmission rate R=(K+1)(M−d+1) bits per channel use.

Proof: As before, we have $$|S| = |\mathcal{A}||\mathcal{C}| = |\mathcal{A}|\prod_{i=0}^{K-1}|C_i|.$$

Since all of the component codes are maximal, they each have $2^{T(M-d+1)}$ code words, the largest possible size for rank-d binary codes. Hence, the transmission rate is $$R = \frac{1}{T}\log_2|S| = (K+1)(M-d+1) \text{ (bits per channel use)}.$$

Now let ΔS=S−S' where $S=r^A \odot \theta^C$ and $S'=r^{A'} \odot \theta^{C'}$ are distinct code words in S. Depending on whether C=C' or C≠C', one of the congruences of equations (3) and (6) still holds. By Corollary 4, ΔS is therefore of rank at least d over C. Since S achieves the maximum transmission rate for a space-time code having transmit diversity d, it can be concluded that S achieves transmit diversity exactly d.

The following is a novel variation on the Dual-Radii Construction in which the choice of the $2^K$-ary matrix C also determines the binary matrix A. In this case, the underlying constellation is non-degenerate but of smaller size than in the previous construction. These codes also achieve the rate-diversity tradeoff.

Corollary 7 (Dual-Radii Special A Construction) Let $$C = \sum_{i=0}^{K-1} 2^i C_i,$$

where the binary codes $C_i$ are maximal M×T rank-d codes. Let θ be a complex, primitive $2^K$-th root of unity. Choose nonzero v∈Z[θ] such that v≡0 (mod 1−θ), and set r=2v+1. Then the modulated space-time code defined by $$S=\{S=r^A \odot \theta^C : A=\mu(C)=C_0 \text{ and } C \in C\}$$

achieves transmit diversity d and transmission rate R=K(M−d+1) bits per channel use.

Proof: That the achieved transmit diversity is at least d follows the same argument as before. Unlike the prior construction, however, with this choice for A, the underlying constellation consists of two rings of $2^{K-1}$-PSK instead of $2^K$-PSK. Hence, the achieved transmission rate is the maximum possible for a diversity d space-time code over this constellation. Consequently, the achieved transmit diversity must be exactly d.

Remark. In Corollary 7, the mapping μ may be replaced by an arbitrary mapping $\Psi: C \to F^{M \times T}$. In this case, S still achieves transmit diversity at least d. Whether or not S achieves the rate-diversity tradeoff depends on the choice of Ψ.

B. Multi-Radii PSK Constructions

The dual-radii $2^K$-PSK construction can be extended to provide novel space-time codes for multi-radii AM-PSK constellations.

Theorem 8 (Multi-Radii Construction) Let $A_1, A_2, \ldots, A_L$ be maximal M×T rank-d binary codes with M≦T. Let $$C = \sum_{i=0}^{K-1} 2^i C_i,$$

where the binary codes $C_i$ are also maximal M×T rank-d codes. Let θ be a complex, primitive $2^K$-th root of unity. Choose $\in_1, \in_2, \ldots, \in_L \in Z[\theta]$ such that $\in_i \equiv 0$ (mod 1−θ) for all i=1, 2, . . . , L. Let $$v_i = \prod_{l=1}^{i} \varepsilon_l,$$

and set $r_i=2v_i+1$ for i=1, 2, . . . , L. Then the modulated space-time code defined by $$S = \left\{ S = \left( \bigodot_{i=1}^{L} r_i^{A_i} \right) \odot \theta^C : C \in C \text{ and, } \forall i, A_i \in \mathcal{A}_i \right\}$$

achieves transmit diversity at least d. If the underlying constellation is non-degenerate, then S achieves transmission rate R=(K+L)(M−d+1) bits per channel use and transmit diversity exactly d.

Proof: When the underlying constellation is non-degenerate, it consists of $2^L$ rings of $2^K$-PSK, so the transmission rate achieved by S is clear. Therefore, it suffices to show that S achieves diversity at-least d.

Consider the distinct code words $$\left( \bigodot_{i=1}^{L} r_i^{A_i} \right) \odot \theta^C \text{ and } S' = \left( \bigodot_{i=1}^{L} r_i^{A'_i} \right) \odot \theta^{C'} \text{ in } S.$$

in S. It must be shown that the matrix ΔS=S−S' is of rank at least d over C.

First consider the partial products of S defined by $$\sigma_0 = \theta^C, \quad (7)$$

$$\sigma_l = \left( \bigodot_{i=1}^{l} r_i^{A_i} \right) \odot \theta^C, \quad (1 \leq l \leq L). \quad (8)$$

They are related by the following recursive sum and its expansion:

$$\sigma_l = \sigma_{l-1} + (r_l - 1) A_l \odot \sigma_{l-1} \quad (9)$$

$$= \sigma_0 + (r_1 - 1) A_1 \odot \sigma_0 + \quad (10)$$

$$(r_2 - 1) A_2 \odot \sigma_1 + \ldots + (r_l - 1) A_l \odot \sigma_{l-1}.$$

The partial products $\sigma'_0, \sigma'_1, \ldots, \sigma'_L$ of S' are of course similarly defined.

Then, from (10), we have $$S = \theta^C + 2 \sum_{i=1}^{L} v_i A_i \odot \sigma_{i-1} \quad (11)$$

$$S' = \theta^{C'} + 2 \sum_{i=1}^{L} v_i A'_i \odot \sigma'_{i-1}, \quad (12)$$

so that $$\Delta S = (\theta^C - \theta^{C'}) + 2 v_1 D, \quad (13)$$

where $$D = \sum_{i=1}^{L} \left( \frac{v_i}{v_1} \right) (A_i \odot \sigma_{i-1} - A'_i \odot \sigma'_{i-1}). \quad (14)$$

Note that $v_i | v_j$ in Z[θ] whenever i≦j, so the fraction on the right in (14) is an algebraic integer. To show that ΔS is of rank at least d over C, there are two cases to consider.

Case 1. C=C'. Let l be the smallest index i for which $A_i \neq A'_i$. Then $\sigma_i = \sigma'_i$ for i<l. From (13) and (14), we have $$\frac{\Delta S}{2v_\ell} = \sum_{i=0}^{L-\ell} \left(\frac{v_{\ell+i}}{v_\ell}\right)(A_{\ell+i} \odot \sigma_{\ell+i-1} - A'_{\ell+i} \odot \sigma'_{\ell+i-1}). \quad (15)$$

Observing that all of the partial products $\sigma_i$ and $\sigma'_i$ are congruent to 1 (mod 1−θ) and all but the first of the coefficients $$\left(\frac{v_{\ell+i}}{v_\ell}\right)$$

are multiples of $\in_{\ell+j}$, we see $$\frac{\Delta S}{2v_\ell} \equiv A_\ell \oplus A'_\ell \pmod{1-\theta}. \quad (16)$$

Therefore, from Corollary 4, ΔS is of rank at least d over C by the choice of code $A_\ell$.

Case 2. C≠C'. Equations (2) and (13) differ only in the choice of the matrix D. In the proofs of Theorems 5 and 6 for this case, the argument that ΔS is of rank at least d over C does not depend on D.

Remark. As a special case of Theorem 8, we may take v∈Z[θ] such that v≡0 (mod 1−θ) and set $r_i = 2v^i + 1$ for i=1, 2, . . . , L. Representative examples of the constellations supporting this construction are given below.

The Special A construction may be generalized in many different ways for the multi-radii constellations. The following version is representative.

Corollary 9 (Multi-Radii Special A Construction) Let $$C = \sum_{i=0}^{K-1} 2^i C_i,$$

where the binary codes $C_i$ are maximal M×T rank-d codes. Let θ be a complex, primitive $2^K$-th root of unity. Choose $\in_1$, $\in_2$, . . . , $\in_L \in Z[\theta]$ such that $\in_i \equiv 0$ (mod 1−θ) for all i=1, 2, . . . , L≤K. Let $$v_i = \prod_{\ell=1}^{i} \varepsilon_\ell,$$

and set $r_i = 2v_i + 1$ for i=1, 2, . . . , L. Then the modulated space-time code defined by $$S = \left\{ S = \left(\bigodot_{i=1}^{L} r_i^{A_i}\right) \odot \theta^C : C = \sum_{i=0}^{K-1} 2^i C_i \in C \text{ and, } \forall i, A_i \in C_i \right\}$$

achieves transmit diversity at least d. If the underlying constellation is non-degenerate, then S achieves transmission rate R−K(M−d+1) bits per channel use and transmit diversity exactly d.

Proof: If non-degenerate, the underlying constellation consists of $2^L$ rings of $2^{K-L}$ points, and S achieves the rate-diversity tradeoff.

Remark. In corollary 9, we may take $A_i = \Psi_i(C)$, where the $\Psi_1, \Psi_2, \ldots, \Psi_L : C \to F^{M \times T}$ are arbitrary functions. In this case, S still achieves transmit diversity at least d. Whether or not S achieves the rate-diversity tradeoff depends on the choice of the $\Psi_i$. One may also consider hybrids of Theorem 8 and Corollary 9 in which some of the $A_i$ are derived from the matrix C and others are freely chosen from a maximal rank d binary code.

Figure 5:
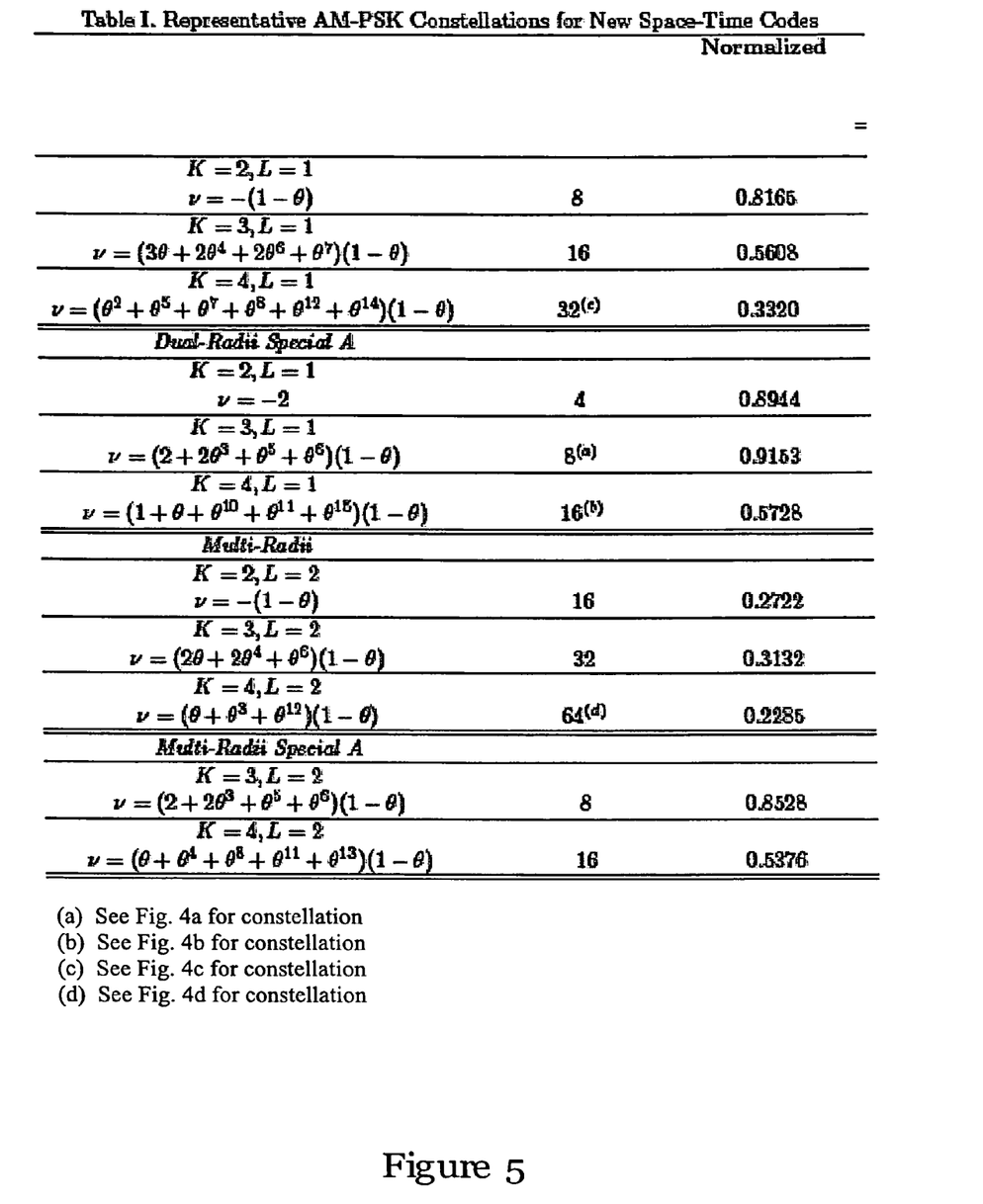
FIG. 5 is a table of representative AM-PSK constellations for space-time codes corresponding to FIGS. 4a-4d.

Examples. In the new dual-radii and multi-radii space-time code constructions, the underlying AM-PSK constellations are determined by the algebraic integers used as the basis for the signaling. FIGS. 4a-d are constellation diagrams for representative 8-ary, 16-ary, 32-ary, and 64-ary cases. When the constellation is normalized to unit average energy, the Euclidean distance between the closest constellation points can be used as a convenient figure-of-merit to judge the relative efficiency of the constellation. FIG. 5 provides a list of representative AM-PSK constellations corresponding to the constellation diagrams of FIGS. 4a-4d. In the case of the multi-radii constructions, the examples are for the special case $\in_1 = \in_2 = \ldots = \in_L = v$, for which $r_i = 2v^i + 1$. Improvements in the normalized minimum distance should be expected if the $\in_i$ are chosen without restriction.

For comparison with these representative AM-PSK examples, the normalized minimum distances for $2^m$-PSK are as follows: 1.4142 for QPSK, 0.7654 for 8-PSK, 0.3902 for 16-PSK, 0.1960 for 32-PSK, and 0.0981 for 64-PSK. For $4^K$-QAM, the corresponding normalized minimum distances are 1.4142 for 4-QAM (QPSK), 0.6325 for 16-QAM, and 0.3086 for 64-QAM. One sees that, for the moderate and intermediate constellation sizes, the new AM-PSK space-time codes fill a useful gap not covered by the Lu-Kumar unified construction.

Incorporation of the Lu-Kumar Unified Framework

The Lu-Kumar unified space-time code construction generalizes the basic $2^m$-PSK dyadic construction to produce space-time codes for $2^m$-PAM, $4^m$-QAM, and other exotic higher-order constellations, by proper choice of design parameters. Remarkably, these codes achieve the rate-diversity tradeoff. The Lu-Kumar unified construction may be extended to an even more general construction that includes the novel multi-radii $2^m$-PSK codes of the present invention (plus their generalization to other constellations). In general, the space-time codes produced by the novel "super-unified" construction of the present invention also achieve the rate-diversity tradeoff. For ease of presentation, the unification results are described in two parts. First, the simpler dual-radii case is discussed, followed by a discussion of the general multi-radii case.

A. Incorporation of the Dual-Radii Construction

Theorem 10: Let A be a maximal M×T rank-d binary code. Let K and U be positive integers, and let $\{C_{u,k} : 0 \leq u < U, 0 \leq k < K\}$ be a collection of UK maximal M×T rank-d binary codes. From these, form the following set of $2^K$-ary codes:

$$C_u = \left\{ C_u = \sum_{k=0}^{K-1} 2^k C_{u,k} : C_{u,k} \in C_{u,k} \right\} \quad (0 \leq u < U).$$

Let κ be a non-zero complex number, and θ be a complex primitive $2^K$-th root of unity. Choose non-zero η∈2Z[θ] and v∈Z[θ] such that $\eta^{U-1}|v$ in Z[θ] and $v/\eta^U - 1 \equiv 0$ (mod 1−θ).

Set r=2v+1. Then the modulated space-time code defined by $$S = \left\{ S = r^A \odot \kappa \sum_{u=0}^{U-1} \eta^u \theta^{C_u} : A \in A \text{ and } C_u \in C_u \ (0 \le u < U) \right\} \quad (17)$$

achieves transmit diversity at least d. If the underlying constellation is non-degenerate, then $\mathcal{S}$ achieves transmission rate R=(UK+1)(M−d+1) bits per channel use and transmit diversity exactly d.

Proof: Let $$S = r^A \odot \kappa \sum_{u=0}^{U-1} \eta^u \theta^{C_u} \text{ and } S' = r^{A'} \odot \kappa \sum_{u=0}^{U-1} \eta^u \theta^{C'_u}$$

be distinct code words in S. When the two summations are equal, the argument is the same as case 1 in the proofs of Theorems 5 and 6. So we assume they differ in at least one component. Let (u*, k*) denote the lexographically first index pair (u, k) for which $C_{u,k} \ne C'_{u,k}$. Then $$\Delta S = S - S' = \kappa \eta^{u^*} \theta^P \odot \left( \theta^{2^{k^*} Q} - \theta^{2^{k^*} Q'} \right) + 2\kappa v D + \kappa \eta^{u^*+1} E, \quad (18)$$

where $$D = A \odot \sum_{u=0}^{U-1} \eta^u \theta^{C_u} - A' \odot \sum_{u=0}^{U-1} \eta^u \theta^{C'_u},$$

$$E = \sum_{i=0}^{U-u^*-2} \eta^i \left( \theta^{C_{u^*+i+1}} - \theta^{C'_{u^*+i+1}} \right),$$

$$P = \sum_{i=0}^{K^*-1} 2^i C_{u^*,i}, \quad Q = \sum_{i=0}^{K-k^*-1} 2^i C_{u^*,k^*+i}, \text{ and}$$

$$Q' = \sum_{i=0}^{K-k^*-1} 2^i C'_{u^*,k^*+i}. \text{ Then}$$

$$\frac{\Delta S}{\kappa \eta^{u^*}(1 - \theta^{2^{k^*}})} = \theta^P \odot \left( \frac{\theta^{2^{k^*} Q} - \theta^{2^{k^*} Q'}}{1 - \theta^{2^{k^*}}} \right) + \left( \frac{2}{1 - \theta^{2^{k^*}}} \right) \left( \frac{v}{\eta^{u^*}} \right) D + \left( \frac{\eta}{1 - \theta^{2^{k^*}}} \right) E. \quad (19)$$

The terms in parentheses on the right hand side are either scalars in Z[θ] or matrices with entries in Z[θ]. The two rightmost summands are congruent to 0 (mod 1−θ). Hence, $$\frac{\Delta S}{\kappa \eta^{u^*}(1 - \theta^{2^{k^*}})} \equiv C_{u^*,k^*} \oplus C'_{u^*,k^*} \ (\text{mod} \ 1 - \theta). \quad (20)$$

By Corollary 4, ΔS is of rank at least d over C, which completes the proof.

Remark. When r=1, the resulting construction is the Lu-Kumar unified construction. By proper choice of parameters, the Lu-Kumar unified construction provides space-time codes that achieve the rate-diversity tradeoff for $2^m$-PAM, $4^m$-QAM, and $2^m$-PSK constellations—specifically, for PAM, one chooses the parameters η=2, K=1, U=m, κ=1, θ=−1; for QAM, one chooses η=2, K=2, U=m, κ=1+i, θ=i; and for PSK, one chooses η=2, K=m, U=1, κ=1, θ=$e^{2\pi i/2^m}$. The dual-radii $2^m$-PSK codes arise from the "super-unified" construction by taking r≠1 along with the indicated PSK-selecting parameters in the Lu-Kumar construction.

The following variation follows from the same argument as in Corollary 7.

Corollary 11 Let K and U be positive integers, and let $\{C_{u,k}: 0 \le u < U, 0 \le k < K\}$ be a collection of UK maximal M×T rank-d binary codes. From these, form the following set of $2^K$-ary codes:

$$C_u = \left\{ C_u = \sum_{k=0}^{K-1} 2^k C_{u,k} : C_{u,k} \in C_{u,k} \right\} \ (0 \le u < U).$$

Let $\Psi: C_0 \times C_1 \times \ldots \times C_{U-1} \to A$ be a function that maps U-tuples of non-binary codeword matrices to binary M×T matrices, the range A being arbitrary.

Let κ be a non-zero complex number, and θ be a complex primitive $2^K$-th root of unity. Choose non-zero η∈2Z[θ] and v∈Z[θ] such that $\eta^{U-1}|v$ in Z[θ] and $v/\eta^{U-1} \equiv -0 \ (\text{mod} \ 1-\theta)$. Set r=2v+1. Then the modulated space-time code defined by $$S = \left\{ S = r^A \odot \kappa \sum_{u=0}^{U-1} \eta^u \theta^{C_u} : A = \Psi(C_0, C_1, \ldots, C_{U-1}) \text{ and } C_u \in C_u \ (0 \le u < U) \right\} \quad (21)$$

achieves transmit diversity at least d.

B. Incorporation of the Multi-Radii Construction

Theorem 12 Let $A_1, A_2, \ldots, A_L$ be maximal M×T rank-d binary codes with M≤T. Let K and U be positive integers, and let $\{C_{u,k}: 0 \le u < U, 0 \le k < K\}$ be a collection of UK maximal M×T rank-d binary codes. From these, form the following set of $2^K$-ary codes:

$$C_u = \left\{ C_u = \sum_{k=0}^{K-1} 2^k C_{u,k} : C_{n,k} \in C_{u,k} \right\} \ (0 \le u < U).$$

Let κ be a non-zero complex number, and θ be a complex primitive $2^K$-th root of unity. Choose non-zero η∈2Z[θ] and $\in_1, \in_2, \ldots, \in_L \in Z[\theta]$ such that $\in_i \equiv 0 \ (\text{mod} \ 1-\theta)$ for all i=1, 2, ..., L. Furthermore, we require that $\eta^{U-1}|\in_1$ in Z[θ] and $\in_1/\eta^{U-1} \equiv 0 \ (\text{mod} \ 1-\theta)$. Set $$v_i = \prod_{l=1}^{i} \varepsilon_l$$

and $r_i = 2v_i + 1$ for i=1, 2, ..., L. Then the modulated space-time code defined by $$S = \left\{ S = \left( \bigodot_{i=1}^{L} r_i^{A_i} \right) \odot \kappa \sum_{u=0}^{U-1} \eta^u \theta^{C_u} : A_i \in A_i \text{ and } C_u \in C_u \right\} \quad (22)$$

achieves transmit diversity at least d. If the underlying constellation is non-degenerate, then S achieves transmission rate R=(UK+L) (M−d+1) bits per channel use and transmit diversity exactly d.

Proof: The main points of the proof are briefly sketched. Following the partial product notation introduced in the proof of Theorem 8, let $$S = \left( \bigodot_{i=1}^{L} r_i^{A_i} \right) \odot \kappa \sigma_0 \text{ and } S' = \left( \bigodot_{i=1}^{L} r_i^{A_i'} \right) \odot \kappa \sigma_0^i$$

be distinct code words in S, where $$\sigma_0 = \sum_{u=0}^{U-1} \eta^u \theta^{C_u} \text{ and } \sigma_0' = \sum_{n=0}^{U-1} \eta^u \theta^{C_u'}.$$

It must be shown that $\Delta S = S − S'$ is of rank at least d over C.

When $\sigma_0 = \sigma'_0$, the argument is the same as case 1 in the proof of Theorem 8, with the indicated changes in the initial partial products.

When $\sigma_0 \neq \sigma'_0$, the argument is the same as in the proof of Theorem 10, except that the matrix D in (18) is now given by (14).

Remark. As a corollary to Theorem 12, there is again the Special A construction in which one or more of the binary matrices $A_i$ are derived as functions of the nonbinary matrices $C_u$. The statement of this result is clear from the prior examples (Corollaries 7, 9, and 11) so is omitted for brevity.

Using the ring $Z[\theta]$ of algebraic integers as the basis for signaling and exploiting the isomorphism $Z[\theta]/(1−\theta) \cong F$, Lu and Kumar developed a broadly applicable generalization of the Hammons-El Gamal method of algebraic space-time code design, in which the rank of modulated code words over the field C is inferred from the rank of their projections as matrices over the binary field F. The Lu-Kumar unified space-time code construction extended the Hammons-El Gamal dyadic construction for QPSK-modulated space-time codes to provide codes achieving the rate-diversity tradeoff for all $2^m$-PSK and $4^m$-QAM signaling constellations. Applicant herein has used the Lu-Kumar framework to design novel space-time codes that achieve the rate-diversity tradeoff for multi-radii AM-PSK constellations, which fill a useful gap not covered by the Lu-Kumar unified construction. Applicant has also developed a novel, "super-unified," space-time code construction that unites both the Lu-Kumar unified codes and the new multi-radii AM-PSK codes in a single novel framework providing optimal space-time codes.

The AM-PSK constellations consisting of two or more rings of PSK modulation are of interest to communication systems requiring higher spectral efficiency than typical PSK-modulated systems and less stringent transmitter-receiver linearity requirements than typical QAM-modulated systems. One major aspect of the present invention provides optimal space-time code constructions that can be used with these modulation formats by MIMO communications systems to achieve higher transmission rates and greater reliability over wireless channels Another major aspect of the present invention provides a generalized AM-PSK code construction that is also optimal with respect to the rate-diversity tradeoff and provides through choice of parameters optimal codes for PAM, PSK, QAM, and multi-radii PSK modulation formats. This generalized construction enables a flexible MIMO communication system that can adapt its choice of modulation to meet system demands and channel capabilities while still providing optimal space-time coding.

The invention claimed is:

1. A communication system capable of transmitting a coded information message via simultaneous transmission across a number M.gtoreq.2 of transmitter antennas, said communication system comprising:

one or more constituent encoders for binary codes that are maximal rank d under binary phase shift keying (BPSK) modulation, where d is a design parameter of the system having value between 1 and M inclusive;

a space-time encoder that invokes a set of constituent encoders to produce a set of binary code words, each of which is capable of being arranged into an M.times.T code word matrix in which the i-th row comprises coded bits to be modulated and transmitted from the i-th antenna during T symbol transmission intervals; and a modulation unit capable of generating amplitude-modulated phase shift keying (AM-PSK) modulation consisting of a number 2.sup.L.gtoreq.2 rings of phase shift keying (PSK) modulation, said modulation unit producing AM-PSK symbols for each of the M transmitter antennas in every transmission symbol interval in accordance with the set of binary code word matrices, the (i,j)-th entries of said binary code word matrices together identifying the AM-PSK constellation point to be transmitted by the i-th transmitter antenna at the j-th symbol transmission interval, wherein: the space-time encoder produces a number L+K of binary code words partitioned into two subsets {A.sub.1, A.sub.2, . . . , A.sub.L} and {C.sub.0, C.sub.1, . . . , C.sub.K−1}; and the modulation unit produces symbols from an AM-PSK constellation consisting of 2.sup.L rings of 2.sup.K-PSK using the first set of L binary code words for amplitude modulation and the second set of K binary code words for phase modulation.

2. The communication system of claim 1, wherein the modulation unit implements the operations: 39={S=(i=1 L r i A i ) C: C and, i , A i A i }, where A.sub.1, A.sub.2, . . . A.sub.L are maximal M.times.T rank-d binary codes with M.ltoreq.T; 40 C=i=0. K−1 2 i C i, where the binary codes C.sub.i are also maximal M.times.T rank-d codes; .theta. is a complex, primitive 2.sup.K-th root of unity; .di-elect cons..sub.1, .di-elect cons..sub.2, . . . , di-elect cons..sub.L.epsilon.Z are chosen such that .di-elect cons..sub.i.ident.0 (mod 1−theta.) for all i=1, 2, . . . ,L; 41 v i=1=1 i l, and r.sub.i=2v.sub.i +1 is set for i=1, 2, . . . , L.

3. A communication system capable of transmitting a coded information message via simultaneous transmission across a number M.gtoreq.2 of transmitter antennas, said communication system comprising:

one or more constituent encoders for binary codes that are maximal rank d under binary phase shift keying (BPSK) modulation. where d is a design parameter of the system having value between 1 and M inclusive;

a space-time encoder that invokes a set of constituent encoders to produce a set of binary code words, each of which is capable of being arranged into an M.times.T code word matrix in which the i-th row comprises coded bits to be modulated and transmitted from the i-th antenna during T symbol transmission intervals; and a modulation unit capable of generating amplitude-modulated phase shift keying (AM-PSK) modulation consisting of a number $2^L \geq 2$ rings of phase shift keying (PSK) modulation, said modulation unit producing AM-PSK symbols for each of the M transmitter antennas in every transmission symbol interval in accordance with the set of binary code word matrices, the (i,j)-th entries of said binary code word matrices together identifying the AM-PSK constellation point to be transmitted by the i-th transmitter antenna at the j-th symbol transmission interval, wherein the space-time encoder produces a number K+L of binary code words partitioned into two subsets $\{A_1, A_2, \ldots, A_L\}$ and $\{C_0, C_1, \ldots, C_{K-1}\}$, with a number L−K of the code words in the set $\{A_1, A_2, \ldots, A_L\}$ being computed as a deterministic function of the code words in the set $\{C_0, C_1, \ldots, C_{K-1}\}$, and the modulation unit outputs symbols from an AM-PSK constellation comprising $2^L$ rings of $2^{K-L+k}$–PSK modulation, where $K \leq L > k \geq 0$.

4. The communication system of claim 3, wherein k=0 and the modulation unit implements the operations: 42 $S = \{S = (\prod_{i=1}^{L} r_i A_i) C : C = \prod_{i=0}^{K-1} 2^i C_i C \text{ and}, i, A_i = C_i\}$, where 43 $C = \prod_{i=0}^{K-1} 2^i C_i$, where the binary codes $C_i$ are maximal M×T rank-d codes; where $\theta$ is a complex, primitive $2^K$-th root of unity; where $\epsilon_1, \epsilon_2, \ldots, \epsilon_L \in Z$ is chosen such that $\epsilon_i \equiv 0 \pmod{1-\theta}$ for all $i=1, 2, \ldots, L \leq K$; where 44 $v_{i=1} = 1, 1$, where $r_i = 2v_i + 1$ is set for $i=1, 2, \ldots, L$.

5. A communication system capable of transmitting a coded information message via simultaneous transmission across a number $M \geq 2$ of transmitter antennas, said communication system comprise:

one or more constituent encoders for binary codes, each binary code C being maximal rank d(C) under binary phase shift keying (BPSK) modulation, where d(C) is a value between 1 and M inclusive and is capable of differing for each code C;

a space-time transmission selector that selects the desired information transmission rate, desired diversity level, and desired modulation format to be used for transmission, said format choices including amplitude modulated phase shift keying (AM-PSK) comprising multiple rings of PSK modulation and one or more of pulse amplitude modulation (PAM), quadrature amplitude modulation (OAM), and phase shift keying (PSK);

a space-time encoder that selects a subset of constituent encoders in accordance with a desired transmission rate, desired diversity level, and desired modulation format and invokes this subset to produce a set of binary code word matrices, the i-th row of each matrix comprising coded bits that are to be modulated and transmitted from the i-th antenna; and a modulation unit capable of generating symbols for each of the M transmitter antennas in every transmission symbol interval in accordance with the set of binary code word matrices, the (i,j)-th entries of said binary code word matrices toaether identifying the symbol to be transmitted by the i-th transmitter antenna at the j-th symbol transmission interval, the said symbol being from the signaling constellation associated with the desired modulation format, wherein: the space-time transmission selector chooses parameters K, U, L, . eta., . kappa., and .theta.; the space-time encoder produces a number KU +L of binary code words partitioned into two subsets $\{A_1, A_2, \ldots, A_L\}$ and $\{C_{00}, C_{01}, \ldots, C_{0,K-1}, C_{10}, C_{11}, \ldots, C_{1,K-1}, C_{U-1,0}, C_{U-1,1}, \ldots, C_{U-1,K-1}\}$; and the modulation unit outputs modulated symbols according to the operations: 45 $S = \{S = (\prod_{i=1}^{L} r_i A_i) u = \prod_{u=0}^{U-1} \kappa C u : A_i A_i \text{ and } C u C u\}$, where $\kappa$ is a non-zero complex number; $\theta$ is a complex primitive $2^K$-th root of unity; non-zero $\eta \in 2Z$ and $\epsilon_1, \epsilon_2, \ldots, \epsilon_L \in Z$ are chosen such that $\epsilon_i \equiv 0 \pmod{1-\theta}$ for all $i=1, 2, \ldots, L$; $\eta^{U-1} | \epsilon_1$ in $Z$ and $\epsilon_{1/}\eta^{U-1} \equiv 0 \pmod{1-\theta}$; 46 $v_{i=1} = 1, 1; r_i = 2v_i + 1$ is set for $i=1, 2, \ldots, L$; and 47 $u = \{C u = \prod_{k=0}^{K-1} 2^k C u, k : C u, k u, k\} (0 \leq u_{13} < U)$.

6. The communication system of claim 5 wherein: a number L−k of the code words in the set $\{A_1, A_2, \ldots, A_L\}$ are deterministic functions of the code words in the set $\{C_{00}, C_{01}, \ldots, C_{0,K-1}, C_{10}, C_{11}, \ldots, C_{1,K-1}, C_{U-1,0}, C_{U-1,1}, \ldots, C_{U-1,K-1}\}$.

7. A method of transmitting a coded information message via simultaneous transmission across a number $M \geq 2$ of transmitter antennas, comprising:

encoding one or more binary codes that are maximal rank d under binary phase shift keying (BPSK) modulation, where d is a design parameter of the system having value between 1 and M inclusive;

invoking, using a space-time encoder, a set of constituent encoders to produce a set of binary code words, each of which is capable of being arranged into an M×T code word matrix in which the i-th row comprises coded bits to be modulated and transmitted from the i-th antenna during T symbol transmission intervals;

generating, using a modulation unit, amplitude-modulated phase shift keying (AM-PSK) modulation consisting of a number $2^L \geq 2$ rings of phase shift keying (PSK) modulation, said modulation unit producing AM-PSK symbols for each of the M transmitter antennas in every transmission symbol interval in accordance with the set of binary code word matrices, the (i,j)-th entries of said binary code word matrices together identifying the AM-PSK constellation point to be transmitted by the i-tb transmitter antenna at the j-th symbol transmission interval;

producing, using said space-time encoder, a number L+K of binary code words partitioned into two subsets $\{A_1, A_2, \ldots, A_L\}$ and $\{C_0, C_1, \ldots, C_{K-1}\}$; and producing, using said modulation unit, symbols from an AM-PSK constellation consisting of $2^L$ rings of $2^K$-PSK using the first set of L binary code words for amplitude modulation and the second set of K binary code words for phase modulation.

8. The method of claim 7, wherein the modulation unit implements the operations: 48 $S = \{S = (\prod_{i=1}^{L} r_i A_i) C : C C \text{ and}, i, A_i A_i\}$, where $A_1, A_2, \ldots A_L$ are maximal M×T rank-d binary codes with $M \leq T$; 49 $C = \prod_{i=0}^{K-1} 2^i C_i$, where the binary codes $C_i$ are also maximal M×T rank-d codes; $\theta$ is a complex, primitive $2^K$-th root of unity; $\epsilon_1, \epsilon_2, \ldots, \epsilon_L \in Z$ are chosen such that $c_i \equiv 0 \pmod{1-\theta}$ for all $i=1, 2, \ldots, L$; 50 $\nabla_{i=1}^{1} i 1$, and $r_i = 2v_i + 1$ is set for $i = 1, 2, \ldots, L$.

9. A method of transmitting a coded information message via simultaneous transmission across a number $M \geq 2$ of transmitter antennas, comprising:

encoding one or more binary codes that are maximal rank d under binary chase shift keying (BPSK) modulation, where d is a design parameter of the system having value between 1 and M inclusive;

invoking, using a space-time encoder, a set of constituent encoders to produce a set of binary code words, each of which is capable of being arranged into an $M \times T$ code word matrix in which the i-th row comprises coded bits to be modulated and transmitted from the i-th antenna during T symbol transmission intervals;

generating, using a modulation unit, amplitude-modulated chase shift keying (AM-PSK) modulation consisting of a number $2^L \geq 2$ rings of phase shift keying (PSK) modulation, said modulation unit producing AM-PSK symbols for each of the M transmitter antennas in every transmission symbol interval in accordance with the set of binary code word matrices, the (i,j)-th entries of said binary code word matrices together identifying the AM-PSK constellation point to be transmitted b the i-th transmitter antenna at the j-th symbol transmission interval;

producing, using said space-time encoder, a number K+L of binary code words partitioned into two subsets $\{A_1, A_2, \ldots, A_L\}$ and $\{C_0, C_1, \ldots, C_{K-1}\}$, with a number L−k of the code words in the set $\{A_1, A_2, \ldots, A_L\}$ being computed as a deterministic function of the code words in the set $\{C_0, C_1, \ldots, C_{K-1}\}$; and outputting, using said modulation unit, symbols from an AM-PSK constellation comprising $2^L$ rings of $2^{K-L+k}$-PSK modulation, where $K \geq L > k \geq 0$.

10. The method of claim 9, wherein k=0 and the modulation unit implements the operations: 51 $S = \{S = (\sum_{i=1}^{L} r_i A_i) C : C = \sum_{i=0}^{K-1} 2^i C_i C \text{ and}, i, A_i = C_i\}$, where 52 $C = \sum_{i=0}^{K-1} 2^i C_i$, where the binary codes $C_i$ are maximal $M \times T$ rank-d codes; where $\theta$ is a complex, primitive $2^K$-th root of unity; where $c_1, c_2, \ldots, c_L \in Z$ is chosen such that $c_i \equiv 0 \pmod{1=\theta}$ for all $i=1, 2, \ldots, L$, $l \geq K$; where 53 $\nabla_{i=1}^{1} i 1$, where $r_i = 2v_i + 1$ is set for $i=1, 2, \ldots, L$.

11. A method of transmitting a coded information message via simultaneous transmission across a number $M \geq 2$ of transmitter antennas, said communication system comprise:

encoding one or more binary codes, each binary code C being maximal rank d(C) under binary phase shift keying (BPSK) modulation, where d(C) is a value between 1 and M inclusive and is capable of differing for each code C;

selecting, using a space-time transmission selector, a desired information transmission rate, desired diversity level, and desired modulation format to be used for transmission, said format choices including amplitude modulated phase shift keying (AM-PSK) comprising multiple rings of PSK modulation and one or more of pulse amplitude modulation (PAM), quadrature amplitude modulation (OAM), and phase shift keying (PSK);

selecting, using a space-time encoder, a subset of constituent encoders in accordance with a desired transmission rate, desired diversity level, and desired modulation format;

invoking, using said space-time encoder, the subset of constituent encoders to produce a set of binary code word matrices, the i-th row of each matrix comprising coded bits that are to be modulated and transmitted from the i-th antenna;

generating, using a modulation unit, symbols for each of the M transmitter antennas in every transmission symbol interval in accordance with the set of binary code word matrices, the (i,j)-th entries of said binary code word matrices together identifying the symbol to be transmitted by the i-th transmitter antenna at the i-th symbol transmission interval, the said symbol being from the signaling constellation associated with the desired modulation format;

choosing, using the space-time transmission selector, parameters K, U, L, $\eta$, $\kappa$, and $\theta$;

producing, using the space-time encoder, a number KU+L of binary code words partitioned into two subsets $\{A_1, A_2, \ldots, A_L\}$ and $\{C_{00}, C_{01}, \ldots, C_{0,K-1}, C_{10}, C_{11}, \ldots, C_{1,K-1}, C_{U-1,0}, C_{U-1,1}, \ldots, C_{U-1,K-1}\}$; and outputting, using the modulation unit, modulated symbols according to the operations: 54 $S = \{S = (\sum_{i=1}^{L} r_i A_i) \prod_{i=0}^{U-1} u C u : A_i A_i \text{ and } C u C u\}$, where $\kappa$ is a non-zero complex number; $\theta$ is a complex primitive $2^K$-th root of unity; non-zero $\eta \in 2Z$ and $c_1, c_2, \ldots, c_L \in Z$ are chosen such that $c_i \equiv 0 \pmod{1-\theta}$ for all $i=1, 2, \ldots, L$; $\eta^{U-1} \nvert \varepsilon c_1$ in Z and $c_i / \eta^{U-1} \equiv 0 \pmod{1-\theta}$; 55 $\nabla_{i=1}^{1} i 1$; $r_i = 2v_i + 1$ is set for $i=1, 2, \ldots, L$; and 56 $u = \{C u = \sum_{k=0}^{K-1} 2^k C u, k : C u, k u, k\}(0 u_{13} < U)$.

12. The method of claim 11 wherein: a number L−k of the code words in the set $\{A_1, A_2, \ldots, A_L\}$ are deterministic functions of the code words in the set $\{C_{00}, C_{01}, \ldots, C_{0,K-1}, C_{10}, C_{11}, \ldots, C_{1,K-1}, C_{U-1,0}, C_{U-1,1}, \ldots, C_{U-1,K-1}\}$.

* * * * *